United States Patent
Bouffay et al.

(10) Patent No.: US 9,005,784 B2
(45) Date of Patent: Apr. 14, 2015

(54) DEVICE FOR ELECTRIC POWER SUPPLY OF A PORTABLE LAMP

(75) Inventors: Boris Bouffay, Saint Bernard du Touvet (FR); Philippe Berrel, La Chapelle de Bard (FR)

(73) Assignee: Zedel, Crolles (FR)

( * ) Notice: Subject to any disclaimer, the term of this patent is extended or adjusted under 35 U.S.C. 154(b) by 558 days.

(21) Appl. No.: 13/460,166

(22) Filed: Apr. 30, 2012

(65) Prior Publication Data

US 2012/0301752 A1    Nov. 29, 2012

(30) Foreign Application Priority Data

May 26, 2011    (FR) ..................... 11 01630

(51) Int. Cl.
| | |
|---|---|
| H01M 12/00 | (2006.01) |
| H01M 2/02 | (2006.01) |
| F21L 4/00 | (2006.01) |
| H01M 2/10 | (2006.01) |

(52) U.S. Cl.
CPC ............... *F21L 4/00* (2013.01); *H01M 2/1055* (2013.01); *H01M 2/1066* (2013.01)

(58) Field of Classification Search
None
See application file for complete search history.

(56) References Cited

U.S. PATENT DOCUMENTS

| | | | |
|---|---|---|---|
| 5,071,716 A * | 12/1991 | Petzl et al. ................... | 429/9 |
| 2002/0060550 A1 | 5/2002 | Pautet et al. | |
| 2004/0038088 A1 | 2/2004 | Suto | |
| 2004/0081884 A1 | 4/2004 | Bean et al. | |
| 2005/0122715 A1 * | 6/2005 | Furth et al. ................ | 362/208 |
| 2009/0040752 A1 * | 2/2009 | Dallas ....................... | 362/202 |
| 2010/0177510 A1 | 7/2010 | Martin et al. | |

FOREIGN PATENT DOCUMENTS

| | | |
|---|---|---|
| FR | 2 650 123 A1 | 1/1991 |
| FR | 2 941 032 A1 | 7/2010 |

* cited by examiner

*Primary Examiner* — Barbara Gilliam
*Assistant Examiner* — Stephan Essex
(74) *Attorney, Agent, or Firm* — Oliff PLC

(57) ABSTRACT

This device comprises an enclosure and electric connections for connection, in a power supply circuit, with either one of two interchangeable electric power sources, as required. The enclosure delineates a housing accommodating either two primary cells together or a storage battery. A contact for connecting a terminal of one of the primary cells to a terminal of the other primary cell comprises a clamp that is deformable between a first configuration in which each one of two facing branches of the contact is positioned to connect one of said terminals by penetrating into an accommodating volume for accommodating the storage battery, and a second configuration in which the two branches are placed outside said accommodating volume which is left free.

11 Claims, 2 Drawing Sheets

DEVICE FOR ELECTRIC POWER SUPPLY OF A PORTABLE LAMP

BACKGROUND OF THE INVENTION

The invention relates to the field of portable electric lamps, including lamps called "headlamps" which are worn on the forehead so as to perform lighting in the forward direction, being for example able to be fitted on a helmet. More precisely, the invention relates to an electric power supply device for supplying electric power to a portable lamp, of the kind comprising an enclosure and electric connections for connection, in a power supply circuit, with either one of two interchangeable electric power sources, as required, that are a rechargeable storage battery and a set of at least two primary cells. In the electric power supply device of the kind considered here, the electric connections comprise a contact for connecting a terminal of one of the primary cells to a terminal of the other primary cell, whereas the enclosure delineates a housing for accommodating either the primary cells together or the rechargeable storage battery.

STATE OF THE ART

A portable electric lamp is conventionally equipped with one or more light sources that are generally chosen from LEDs or bulbs and that are supplied by an electric power source. This electric power source comprises means for storing energy that can be in the form of one or more disposable primary cells or in the form of one or more rechargeable batteries.

A primary cell has standardized external dimensions which make it both interchangeable with another primary cell of the same type and able to be fitted in a large number of different devices. On account of its extensive diffusion, a primary cell is often available in a large number of stores and procurement of primary cells is generally easy, even in isolated and/or wild areas, which are precisely preferred areas for using portable lamps.

A rechargeable or storage battery presents other advantages than disposable primary cells. A rechargeable battery can in particular give a greater autonomy, by providing an electric power supply for a longer period of time.

Some portable lamps have been designed to be able to be supplied with power in two alternative and complementary manners, more precisely by primary cell or by storage battery. The use of such lamps combines the advantages of power supply by a primary cell or cells and the advantages of use of a storage battery or batteries.

One particular advantage procured by a portable lamp with power supply by primary cell or by storage battery further consists in being able to implement a strategy in which power supply by storage battery is chosen in priority manner and, in case of outage or complete discharge of the storage battery, replacement primary cells are used as back-up power supply and/or as normal recharges. Such a strategy assumes that the user carries spare primary cells with him, which primary cells generally present the advantages of being less heavy, less bulky and cheaper than a rechargeable battery.

However, one difficulty to be overcome is that the primary cell does not have the same format as the storage battery, nor is it connected in the same way in the lamp.

In French patent application FR 2,941,032, a device for power supply of a lamp by storage battery or primary cells is described. This device comprises a front case and a rear case which can be articulated on this front case in a supply configuration by primary cells, and which can then be placed in the closed position so as to be able to secure the primary cells in place in recesses. In a configuration for supplying by storage battery, the two front and rear cases are separated from one another by an accumulator unit inserted between the cases. This accumulator unit is provided with assembly means that are complementary to those of the front case and to those of the rear case. Each one of its front and rear surfaces is further configured to fit tightly onto one of the front and rear cases.

In French patent application FR-2,650,123, a case for cylindrical electric primary cells of different diameters is described. This case comprises swivelling spacers, which can be folded against the bottom of the case. When these spacers are folded, primary cells of large diameter can be fitted and connected in the case. When they are raised, the spacers can raise primary cells of small diameter so that the latter are connected in the case in the same way as primary cells of larger diameter. The solution proposed in this French patent application FR-2,650,123 is suitable in the case of primary cells of different diameters but of the same length, but there still remains a need to find a solution in other cases.

In United States Patent application US 2002/0060550, a supply device is described which is of the above-mentioned kind and which has a single cavity provided with connection terminals and able to accommodate either three primary cells or a rechargeable battery.

SUMMARY OF THE INVENTION

At least one object of the invention is to enable the cost of a device designed to supply electric power to a portable lamp while giving a choice as to the type of power supply, chosen from power supply by primary cell or cells and power supply by storage battery or batteries, to be reduced.

According to the invention, this object is achieved by means of a power supply device which is of the above-mentioned kind and wherein the contact comprises a clamp which is deformable between a first configuration in which each one of two facing branches of this clamp is positioned to connect one of said terminals by penetrating into an accommodating volume for accommodating the storage battery, and a second configuration in which the two branches are placed outside said accommodating volume left free between these two branches.

In addition to achieving the above-mentioned object, the invention can enable one or more additional advantages to be obtained, including smaller space occupation, simplification, easier use, enhanced strength and greater dependability of use.

Holding means for holding the two primary cells in the housing have preferably several parts. Each branch preferably defines a terminal for connecting a primary cell, and also a part of the holding means.

Among the parts of the holding means, at least the part defined by one of the branches is advantageously a portion for supporting one end of a body of one of the primary cells in front of the terminal defined by this branch.

The clamp forms a gripping means for gripping the storage battery.

Each branch preferably comprises one of two ramps of a convergent arrangement for guiding the storage battery to a space between the two branches when this storage battery is fitted in said accommodating volume.

The contact is advantageously flexibly biased to its first configuration by being flexibly deformable from this first configuration to its second configuration.

The electric power supply device preferably comprises arresting stops designed to prevent the branches from moving towards one another beyond the second configuration.

The two branches of the contact advantageously extend on each side of a longitudinal axis of the housing, starting substantially from a first end of the housing which comprises a second end opposite this first end. Each branch preferably comprises a free end between the first and second ends of the housing.

The free end of each branch preferably defines a terminal for connecting one of the primary cells.

The housing advantageously comprises a length in the direction of which there extends an opening for lateral access to his housing, in which case the enclosure comprises a cover for closing this lateral opening. Preferably, the two branches delineate between them a space globally having the shape of a slot which opens laterally into the opening giving access to the housing.

The contact preferably comprises a mounting base which joins the two branches to one another.

Each branch advantageously comprises a wing for securing to a bottom of the housing and for guiding this branch in to-and-fro movement relative to the other branch. This securing and guiding wing is engaged behind a portion of the bottom so as to be secured in the opposite direction to this bottom and to be able to slide in parallel manner to a relative movement of the two branches towards or away from one another. The securing and guiding wings preferably further form arresting stops to stop movement of the two branches towards one another at a minimum clearance value. This minimum value is advantageously chosen such that engagement of the storage battery between the two branches remains an operation that is easy to perform.

The contact is preferably made in a shaped metal blank.

A symbol is advantageously drilled on each branch indicating the polarity of the terminal defined by this branch.

The contact is preferably in one piece, i.e. monobloc. It can also comprise several electrically connected parts.

BRIEF DESCRIPTION OF THE DRAWINGS

Other advantages and features will become more clearly apparent from the following description of a particular embodiment of the invention given for non-restrictive example purposes only and represented in the accompanying drawings, in which.

DESCRIPTION OF A PREFERRED EMBODIMENT OF THE INVENTION

Figure 1:
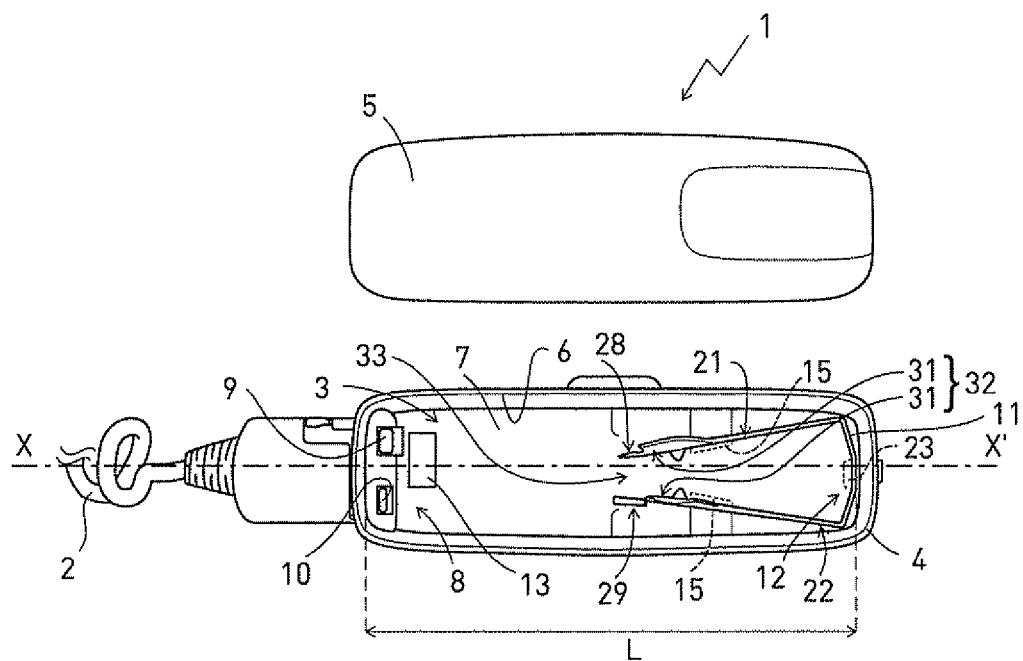
FIG. 1 is a plan view of a case of an electric power supply according to the invention and represents the latter in an open state where a cover and the rest of this case are dissociated.

FIG. 1 shows a portable case 1 for electric power supply of a portable lamp, known as such and not represented, which is more specially a headlamp distinct from this case 1 in a preferred application, while at the same time also being able to be a portable electric lamp of another type, for example a pocket lamp.

Connection to the lamp to be electrically supplied is performed by means of an electric lead 2, only one end of which lead, connected to case 1, is represented in FIG. 1.

Case 1 comprises an enclosure in two parts that are dissociable from one another and complementary to one another, each of which partially delineates an internal housing 3. These two parts are a body 4 and a cover 5 for closing an opening 6 providing lateral access to this housing 3. An add-on base 7 forming part of case 1 is fitted in body 4, on the opposite side from opening 6.

Case 1 and housing 3 are elongate along one and the same longitudinal axis X-X'. Opening 6 extends substantially over the whole length L of housing 3.

At one end 8 of housing 3, body 4 has two contacts or poles 9 and 10 of opposite polarities, which are transversely offset from one another and are arranged on each side of longitudinal axis X-X'. Each pole 9 or 10 is designed for connection of a terminal of a standard primary cell and forms part of electric connections for connecting either one, as required, of two interchangeable electric power sources, in a circuit for power supply of the portable lamp. These connections comprise connections which connect poles 9 and 10 to two conducting wires of lead 2, in a manner known as such, and which are masked by bottom 7. The electric connections also comprise a contact 11.

Contact 11 is located in housing 3 and is designed to connect two primary cells in a manner that is specified more precisely further on. It is fixed in body 4, on bottom 7, at the level of end 12 of housing 3, i.e. opposite from end 8.

Other connection means equipping case 1 present the form of a female connector 13 for connection of a removable storage battery. In the same way as poles 9 and 10, this connector 13 is electrically connected to the two conducting wires of lead 2 in a manner known as such.

Figure 2:
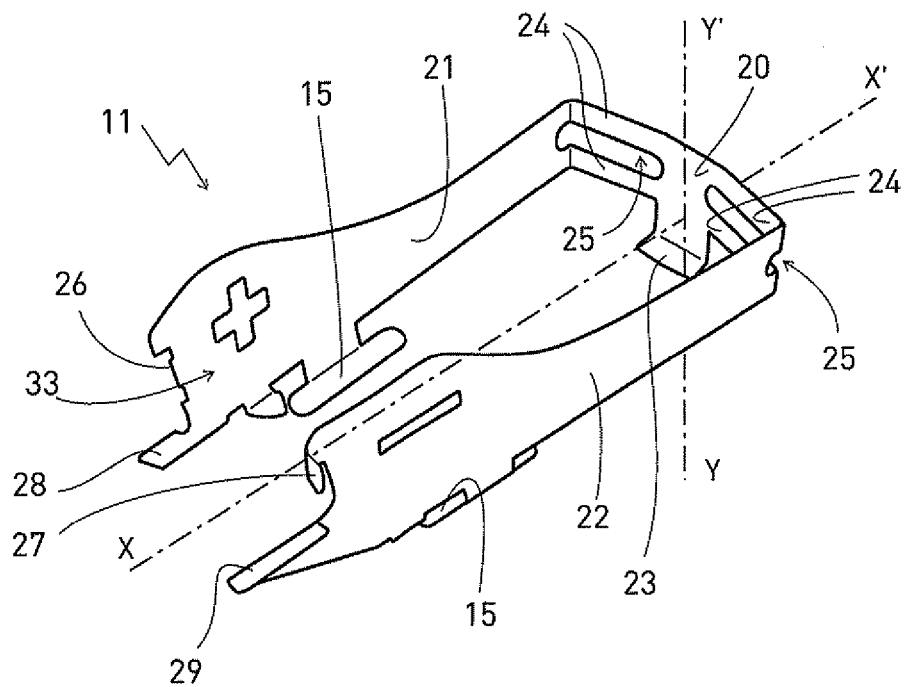
FIG. 2 is a perspective view of a contact constituting the case represented in FIG. 1.

In FIG. 2, contact 11 is represented alone. It is made in a metal spring steel blank shaped by successive folding operations so as to comprise a globally transverse intermediate assembly base 20 and two lateral branches 21 and 22. The latter extend facing one another on each side of longitudinal axis X-X', starting from base 20.

In order to be secured by hooking to bottom 7, base 20 is provided with a tab 23 salient in a direction parallel to axis X-X', towards end 8 of housing 3.

On each side of this tab 23, base 20 forms one of symmetrical elastically flexible blades 24, one of which supports one of the two branches 21 and 22, at its distal end, and which are blades flexibly biasing these branches 21 and 22 towards one another. Each blade 24 has a slot 25 drilled therein to reduce its stiffness in flexion.

Each branch 21 or 22 is globally rectilinear and extends substantially at right angles from a blade 24. The two blades 24 are inclined towards the inside of housing 3 by several degrees around a transverse axis Y-Y' with respect to the transverse plane containing this axis. In this way, branches 21 and 22 are inclined towards one another so as to go closer to one another, and to longitudinal axis X-X', when going progressively away from base 20.

Each branch 21 or 22 is provided with a wing 15 for securing to bottom 7. The two wings 15 are salient towards one another in the same plane. Once they are in the operational position, they penetrate behind bottom 7 so as to be secured there while at the same time being able to slide with a relative to-and-from movement and to thereby accompany swivelling of branches 21 and 22 with respect to one another around axis Y-Y'.

The bases of wings 15 further form arresting stops to stop movement of the two branches 21 and 22 towards one another at a minimum clearance value. This minimum value is advantageously chosen such that engagement of storage battery A between the two branches 21 and 22 remains an operation that is easy to perform.

Opposite base 20, each branch 21 or 22 has a free end which forms a terminal 26 or 27 for connection with a terminal of a battery, facing one of poles 9 and 10, and a support finger 28 or 29 for supporting one end of the body of the same battery in front of this terminal 26 or 27.

Like poles 9 and 10, terminals 26 and 27 are of opposite polarities. Terminal 26 defined by branch 21 is the plus terminal, i.e. of positive polarity, which the "+" symbol drilled into this branch 21 indicates in clearly visible manner. Terminal 27 defined by branch 22 is a minus terminal, i.e. of negative polarity, which the "−" symbol drilled into this branch 22 indicates in clearly visible manner.

Figure 3:
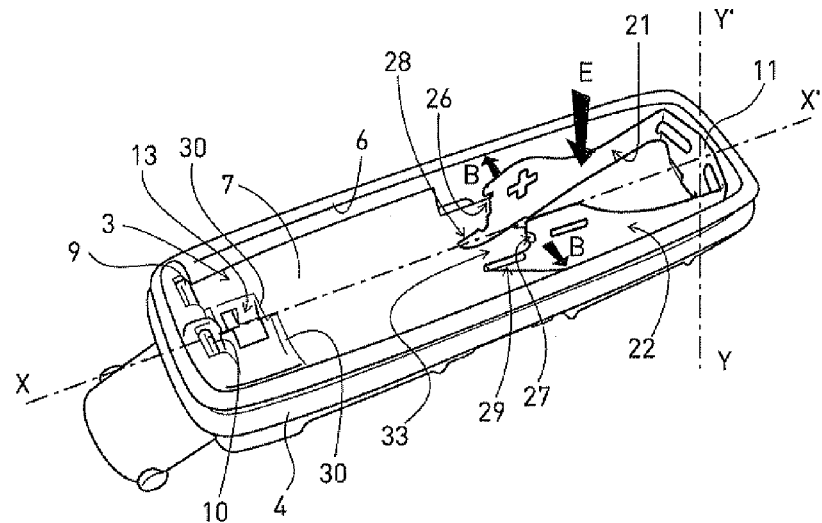
FIG. 3 is a perspective view where the case of FIG. 1 is represented without its cover.

Each one of fingers 28 and 29 forms part of means for securing a battery in operational position. Another part of these means for securing presents the form of supports 30 which are defined by bottom 7 in proximity to end 8 of housing 3, as can be seen in FIG. 3. The inner wall of this housing 3 also participates in wedging the two primary cells together, against one another.

In a manner which is clearly visible in FIG. 1, each of branches 21 and 22 defines one of two ramps 31 of a convergent part 32 guiding towards a space in the form of a longitudinal slot 33 between these two branches. When contact 11 is fitted in place in body 4, this slot 33 opens out laterally towards opening 6 giving access to housing 3, as can be seen in FIG. 3.

Case 1 is compact, simple and inexpensive in consideration of its multiple operating possibilities, which is advantageous. It is in addition robust.

In FIG. 3, cover 5 has been removed and an electric power source such as a storage battery or a pair of primary cells can be fitted in body 4. On account of the way they are arranged, branches 21 and 22 are inclined towards one another so as to progressively penetrate into the central part of housing 3. Plus terminal 26 and minus terminal 27 are therefore respectively facing minus pole 9 and plus pole 10.

Figure 4:
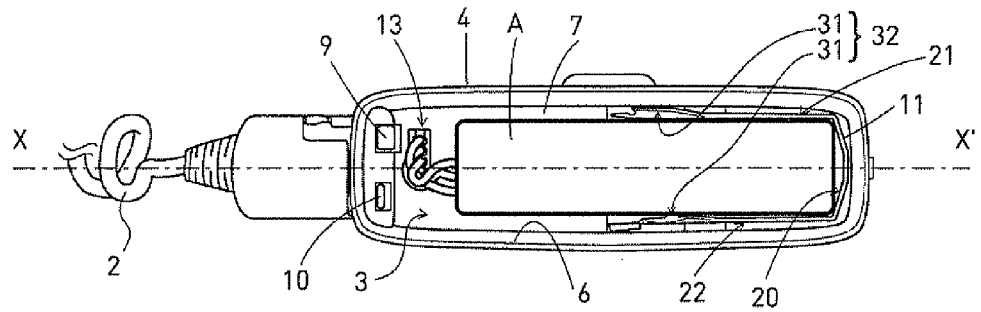
FIG. 4 is a similar view to FIG. 1 and represents the case of this FIG. 1 without its cover, as well as a storage battery fitted in this case.

In FIG. 4, a removable storage battery A is fitted in place in body 4. To be able to fit it in this way, this storage battery A or rechargeable battery is placed in front of opening 6, in parallel manner to longitudinal axis X-X'. Up to this point, branches 21 and 22 penetrate into accommodating volume of storage battery A. One side of storage battery A is then engaged against convergent part 32. When it is then pushed towards bottom 7, storage battery A is depressed between branches 21 and 22 as indicated by arrow E in FIG. 3, being guided between the branches by ramps 31 of convergent part 32, at the same time as it pushes these branches outwards. Again in FIG. 3, arrows B symbolize reversible outward swivelling of branches 21 and 22 under the centrifugal thrust of storage battery A.

In FIG. 4, branches 21 and 22 have been previously moved away from each other by storage battery A and are outside the accommodating volume for accommodating this storage battery A. Having been made to swivel by means of flexible deformation of contact 11 and in particular of its biasing blades 24, branches 21 and 22 clamp storage battery A between them and, in so doing, form a gripping means which keeps this storage battery A in place, which is advantageous.

Again in FIG. 4, a male block for connection of storage battery A is connected in female connector 13. Cover 5 can be refitted in front of opening 6, after which reclosed case 1 is operational as electric power supply for a lamp.

When storage battery A is removed, the flexible bias exerted mainly by blades 24 makes branches 21 and 22 revert to their original position, i.e. that of FIG. 3, where terminals 26 and 27 are positioned for connection with primary cells replacing storage battery A.

In the absence of storage battery A, fitting of two primary cells in body 4 is performed in conventional manner without any operation involving branches 21 and 22. The "+" symbol in branch 21 then indicates the direction of fitting of a battery between pole 9 and terminal 26 of opposite polarities. Likewise the "−" symbol in branch 22 indicates the direction of fitting of another battery between pole 10 and terminal 27 of opposite polarities.

Figure 5:
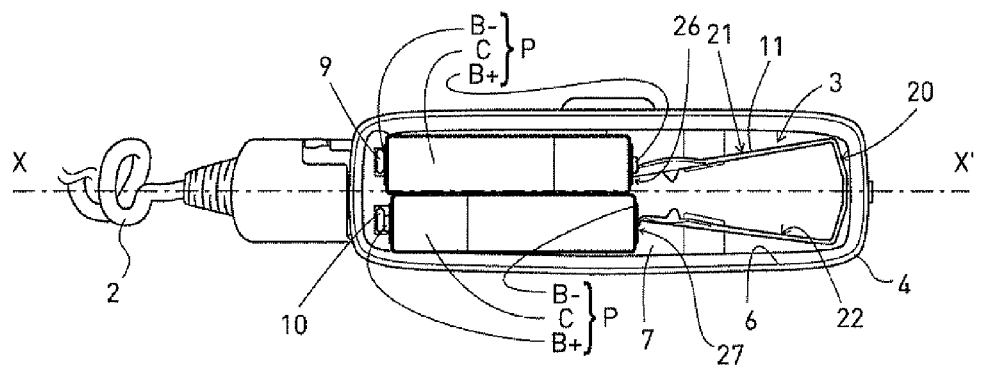
FIG. 5 is also a similar view to FIG. 1 and represents the case of this FIG. 1 without its cover, as well as a pair of primary cells fitted and connected in this case, for alternative operation to that considered in FIG. 4.

In FIG. 5, two identical primary cells P are fitted side-by-side and head-to-tail in body 4. These are two standard primary cells of the type referred to as "round" primary cells and whose minus terminal B− and plus terminal B+ are respectively at one and the other end of the body C of the primary cell. Cells P can be rechargeable or not.

Body C of primary cells P are secured to one another, against one another, between two facing walls of case 1. Each of the primary cells rests both on a finger 28 or 29 and on a support 30. In this way, one primary cell P is connected to pole 9 and to terminal 26, whereas the other primary cell P is connected to pole 10 and to terminal 27. Primary cells P are connected in series in a circuit for power supply of the portable lamp, in so far as contact 11 connects minus terminal B− of one of the primary cells to plus terminal B+ of the other primary cell P.

In the same way as fitting and removal of storage battery A, fitting and removal of primary cells P is easy to perform, which is advantageous.

Furthermore, the use of case 1 is all the more dependable as a change of type of electric power source does not require the use of an independent accessory which is liable to be lost or misplaced.

The invention is not limited to the embodiment described in the foregoing. In particular, instead of presenting the form of a case 1 separated from the lamp to be supplied with electric power, the electric power supply device according to the invention can be integrated in this lamp to form a compact assembly with the latter.

The invention claimed is:

1. A device for electric power supply of a portable lamp, comprising an enclosure and electric connections for connection, in a power supply circuit, with either one, as required, of two interchangeable electric power sources that are a storage battery and a set of at least two primary cells, the electric connections comprising a contact for connecting a terminal of one of the primary cells to a terminal of the other primary cell, the enclosure delineating a housing for accommodating either the primary cells together or the storage battery, wherein said contact comprises a clamp deformable between a first configuration in which each one of two facing branches of this clamp is positioned to connect one of said terminals by penetrating into an accommodating volume for accommodating the storage battery, and a second configuration in which the two branches are placed outside said accommodating volume such that the accommodating volume is between the two branches, wherein, in the first configuration, a free end of each branch defines a terminal for connecting one of the primary cells, and wherein, in the second configuration, the two branches are configured to clamp the storage battery between them.

2. The device of claim 1, wherein each branch also defines a part of a holding means for holding the two primary cells in the housing.

3. The device according to claim 2, wherein at least a part defined by one of the branches is a portion for supporting one end of a body of one of the primary cells in front of the terminal defined by this branch.

4. The device according to claim 1, wherein each branch comprises one of two ramps of a convergent arrangement for guiding towards a space between the two branches.

5. The device according to claim 1, wherein the contact is flexibly biased to its first configuration by being flexibly deformable from this first configuration to its second configuration.

6. The device according to claim 5, comprising arresting stops designed to prevent the branches from moving towards one another beyond the second configuration.

7. The device according to claim 1, wherein the two branches of the contact extend on each side of a longitudinal axis of the housing, substantially from a first end of this housing which comprises a second end opposite this first end, and the free end of each branch is located between the first and second ends of the housing.

8. The device according to claim 1, wherein the housing comprises a length along which an opening for lateral access to this housing extends, the enclosure comprising a cover for closing this lateral opening, the two branches delineating between them a space globally having the form of a slot that opens laterally towards the opening giving access to the housing.

9. The device according to claim 1, wherein the contact comprises a mounting base which connects the two branches to one another.

10. The device according to claim 1, wherein each branch comprises a securing and guiding wing for securing to a bottom of the housing and for guiding this branch in to-and-from movement with respect to the other branch, this securing and guiding wing being engaged behind a portion of bottom so as to be secured in the opposite direction to this bottom and to be able to slide in parallel manner to a relative movement of the two branches towards or away from one another.

11. The device according to claim 1, wherein the contact is monobloc.

* * * * *